United States Patent [19]
Perkins et al.

[11] Patent Number: 5,442,633
[45] Date of Patent: Aug. 15, 1995

[54] SHORTCUT NETWORK LAYER ROUTING FOR MOBILE HOSTS

[75] Inventors: Charles E. Perkins, Ossining; Jacob Y. Rekhter, Putnam Valley, both of N.Y.

[73] Assignee: International Business Machines Corporation, Armonk, N.Y.

[21] Appl. No.: 910,701

[22] Filed: Jul. 8, 1992

[51] Int. Cl.$^6$ ............................ H04B 7/26; H04J 3/26
[52] U.S. Cl. ................................ 370/94.1; 455/54.1; 455/56.1
[58] Field of Search ..................... 370/85.1, 85.2, 85.3, 370/85.7, 85.13, 85.14, 94.1, 94.2, 94.3, 95.1, 95.3, 95.2; 340/825.5, 825.51; 455/39, 68, 53.1, 54.1, 54.2, 55.1, 56.1, 33.1, 33.2; 379/58, 59, 63

[56] References Cited

U.S. PATENT DOCUMENTS

| | | | |
|---|---|---|---|
| 4,644,461 | 2/1987 | Jennings | 364/200 |
| 4,665,519 | 5/1987 | Kirchner et al. | 370/94.1 |
| 4,706,081 | 11/1987 | Hart et al. | 340/825.03 |
| 4,750,109 | 6/1988 | Kita | 364/200 |
| 4,807,222 | 2/1989 | Amitay | 370/85.15 |
| 4,809,257 | 2/1989 | Gentenbein et al. | |
| 4,893,307 | 1/1990 | McKay et al. | 370/94.1 |
| 4,914,652 | 4/1990 | Nguyen | 370/85.5 |
| 5,040,175 | 8/1991 | Tuch et al. | 370/94.1 |
| 5,046,066 | 9/1991 | Messenger | 370/94.1 |
| 5,068,916 | 11/1991 | Harrison et al. | 455/39 |
| 5,210,753 | 5/1993 | Natarajan | 370/95.1 |

FOREIGN PATENT DOCUMENTS

| | | |
|---|---|---|
| 0182417 | 5/1986 | European Pat. Off. . |
| 0328100 | 8/1989 | European Pat. Off. . |
| WO88/07794 | 10/1988 | WIPO . |

OTHER PUBLICATIONS

Data Communications, vol. 16, No. 12, Nov. 1987, New York US, pp. 209–225; D. Retz: "TCP/IP: DOD suite marches into the business world".
"Internet Protocol DARPA Internet Program Protocol Specification", Sep. 1981, Information Sciences Institute, University of Southern CA, Marina del Rey, Calif. 90291.
"Infrared Microbroadcasting Network For In-House Data Communication" F. Gfeller, *IBM Technical Disclosure Bulletin*, vol. 24, No. 8, Jan. 1982.
IEEE Transactions on Communications, vol. 38, No. 8, Aug. 1990, New York, pp. 1272–1280; D. J. Goodwin: "Cellular Packet Communications".
10th Conference On Local Computer Networks, Oct. 1985, New York US pp. 149–157 W. M. Loucks et al.: "Implementation Of A Dynamic Address Assignment Protocol In A Local Area Network" RFC 1122, (Oct. 1989) R. Braden (pp. 35,36).

*Primary Examiner*—Wellington Chin
*Attorney, Agent, or Firm*—Perman & Green

[57] ABSTRACT

A method for routing a packet of information between two hosts that are coupled to a network. Each of the hosts have a unique network address, and at least one of the hosts is a mobile host (10) that does not have a fixed network coupling location. The method includes a first step of (a) transmitting a packet from the mobile host to a second, destination host on the network through a wireless link that is established between the mobile host and a base access station (12) that serves a current physical location of the mobile host. The base access station is coupled to the network via a subnetwork (LAN) (14), and the packet includes a first Internet Protocol (IP) Loose Source Routing (LSR) option that includes a network address of the base access station. A second step (b) receives with the destination host the packet that includes the first IP LSR option. A third step (c) transmits a further, reply packet from the second host to the mobile host via the base access station in accordance with a path reversal technique wherein the reply packet includes a second IP LSR option that specifies as a first Routing address the network address of the base access station. As a result, the reply packet is directed through the network to the base access station that serves the current physical location of the mobile host, and an optimal, fast routing of the packet is achieved without involving intermediate gateways (16, 18).

20 Claims, 4 Drawing Sheets

LSR OPTIONS

TYPE = 131

SHORTCUT NETWORK LAYER ROUTING FOR MOBILE HOSTS

CROSS-REFERENCE TO A RELATED PATENT APPLICATION

This patent application is related to a commonly assigned U.S. patent application entitled "Network Address Management for a Wired Network Supporting Wireless Communication to a Plurality of Mobile Users", Ser. No. 07/605,592, filed Oct. 29, 1990, now U.S. Pat. No. 5,159,592, by C. E. Perkins.

FIELD OF THE INVENTION

This invention relates generally to communication methods and apparatus and, in particular, to methods and apparatus for managing network datagram routing in a network that includes mobile users.

BACKGROUND OF THE INVENTION

Commonly assigned U.S. Pat. No. 4,893,307, issued Jan. 9, 1990, "Method and Apparatus for Linking SNA Terminals to an SNA Host Over a Packet Switched Communications Network", D. B. McKay, R. M. Morten and M. P. Marsili, describes an architectural model of the Department of Defense (DoD) protocol suite.

Referring to FIG. 1, the architecture is said to be similar to, but not identical with, the International Standards Organization (ISO) Open Systems Interconnection (OSI) architecture.

A Defense Data Network (DDN) standard establishes criteria for an Internet Protocol (IP) which supports the interconnection of communication LANs.

It introduces the Internet Protocol's role and purpose, defines the services provided to users, and specifies the mechanisms needed to support those services. The standard also defines the services required of the lower protocol layer, describes the upper and lower interfaces, and outlines the execution environment services need for implementation.

A Transmission Control Protocol (TCP) is a transport protocol providing connection-oriented, end-to-end reliable data transmission in packet-switched computer LANs and internetworks.

The Internet Protocol (IP) and the Transmission Control Protocol (TCP) are mandatory for use in all DoD packet switching networks which connect or have the potential for utilizing connectivity across network or subnetwork boundaries. Network elements, such as hosts, front-ends, gateways, etc., within such networks which are to be used for internetting must implement TCP/IP.

The Internet Protocol is designed to interconnect packet-switched communication LANs to form an internetwork. The IP transmits blocks of data, called internet datagrams, from sources to destinations throughout the internet. Sources and destinations are hosts located on either the same subnetwork or on connected LANs. The IP is intentionally limited in scope to provide the basic functions necessary to deliver a block of data. Each internet datagram is an independent entity unrelated to any other internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural model, the Internet Protocol resides in the internetwork layer. Thus, the IP provides services to transport layer protocols and relies on the services of the lower network protocol. In each gateway, a system interconnecting two or more LANs, an IP resides above two or more LAN's protocol entities. Gateways implement IP to forward datagrams between LANS. Gateways also implement a routing protocol to coordinate signalling and other internet control information.

Various Network Access Protocols reside below the IP and may include, by example, an Ethernet protocol, an X.25 protocol, and, of particular interest herein, a wireless network protocol.

The Internet protocols were originally developed with an assumption that users, each of which is assigned a unique Internet address, would be connected to the network at fixed locations. However, for portable and handheld computers employing a wireless protocol the movement, or migration, of users about the network is typically the rule rather than the exception. As a result, a problem is created in that the implicit design assumptions of the Internet protocol are violated by this type of usage.

The problem that arises thus relates to providing optimal network layer routing with a mobile host, when network layer address(es) assigned to a host may not bear any network topological significance. The problem arises because of a requirement for a host to have an identifier that remains fixed, even as the host moves, while at the same time providing sufficient information in the network layer to make network layer routing feasible.

It is thus an object of this invention to provide a method for optimizing network layer routing between a pair of hosts, where at least one of the hosts is mobile and, as a result, does not have a fixed connection location with respect to the network.

It is another object of the invention to provide a method for optimizing network layer routing between a pair of hosts, where at least one of the hosts is mobile, in the context of a network that operates in accordance with the Internet or an Internet-type protocol.

SUMMARY OF THE INVENTION

The foregoing and other problems are overcome and the objects of the invention are realized by a method for routing a packet of information between two hosts that are coupled to a network. Each of the hosts have a unique network address, and at least one of the hosts is a mobile host that does not have a fixed network coupling location. The method includes a first step of (a) transmitting a packet from the mobile host to a second, destination host on the network through a wireless link that is established between the mobile host and a base access station that serves a current physical location of the mobile host. The base access station is coupled to the network via a subnetwork (LAN), and the packet includes, in a presently preferred embodiment of the invention, an Internet Protocol (IP) Loose Source Routing (LSR) option that includes a network address of the base access station.

A second step (b) receives with the destination host the packet that includes the first LSR option, and a third step (c) transmits a further packet, typically a reply packet, from the second host to the mobile host via the base access station in accordance with a path reversal technique.

In accordance with the path reversal technique, if a host receives a datagram containing a completed source route, i.e. the pointer points beyond the last address field, the datagram is considered to have reached its final destination. The source route option (recorded route), as received, is passed up to a Transport layer, or to ICMP message processing. The recorded route is reversed and is used to form a return source route for reply datagrams. When the return source route is built, it is correctly formed even if the the recorded route included the source host.

As a result, the reply packet (datagram) is directed through the network to the base access station that serves the current physical location of the mobile host, and an optimal, fast routing of the packet is achieved without requiring the involvement a mobile router.

In response to the mobile host establishing a wireless link with a second base access station on the same or a different subnetwork, the method includes the steps of determining the network address of the second base access station with the mobile host; transmitting the network address of the second base access station from the mobile host to a mobile router that is coupled between the subnetwork and the network, the transmission including the network address of the mobile host; and maintaining the network address of the mobile host and the network address of the second base access station with the mobile router.

The mobile router advertises to the network the network address of the mobile router and also the network address of network associated with the mobile hosts.

The step of transmitting the reply packet includes the steps of receiving the reply packet at the base access station; and determining if the mobile host is currently located within the physical area served by the base access station.

If it is determined that the mobile host is currently located within the physical area served by the base access station, the method forwards the reply packet from the base access station over the wireless link to the mobile host.

If, instead, it is determined that the mobile host is not currently located within the physical area served by the base access station, the method forwards the reply packet from the base access station over the network to the mobile router, if there are no further intermediate addresses within the LSR option. The mobile router then forwards the reply packet to a second base access station that serves a physical location within which the mobile host is currently located.

In response to a reception of an packet by the mobile router from the network, the packet not including a LSR option and having the network address of the mobile host as a destination address, the method includes the steps of (a) converting the received packet into an packet that includes a LSR option, the LSR option being provided by the mobile router with the network address of the base access station that is serving the physical location within which the mobile host is currently located; (b) forwarding the converted packet from the mobile router to the base access station that serves the physical location within which the mobile host is currently located; and (c) receiving the converted packet and forwarding the received converted packet from the base access station, over the wireless link, to the mobile host.

BRIEF DESCRIPTION OF THE DRAWING

The above set forth and other features of the invention are made more apparent in the ensuing Detailed Description of the Invention when read in conjunction with the attached Drawing, wherein:

FIG. 3b illustrates a format of a Loose Source and Record Route (LSSR) option employed in the OPTION field of FIG. 3a.

DETAILED DESCRIPTION OF THE INVENTION

It is noted that the method described in detail below is applicable to hosts that use either the IP, or a protocol known as the Connectionless-Mode Network Service Protocol (CLNP), as the network layer protocol. IP is described in detail in a document entitled "Internet Protocol Darpa Internet Program Protocol Specification", September 1981, RFC:791. CLNP is described in a document entitled "Protocol for providing connectionless-mode network service", ISO 8473. Although the ensuing description is made specifically with reference to the IP, it should be realized that support for CLNP may be accomplished using the same techniques. As such, the teaching of the invention is not intended to be limited in scope to only networks that employ IP.

Figure 2:
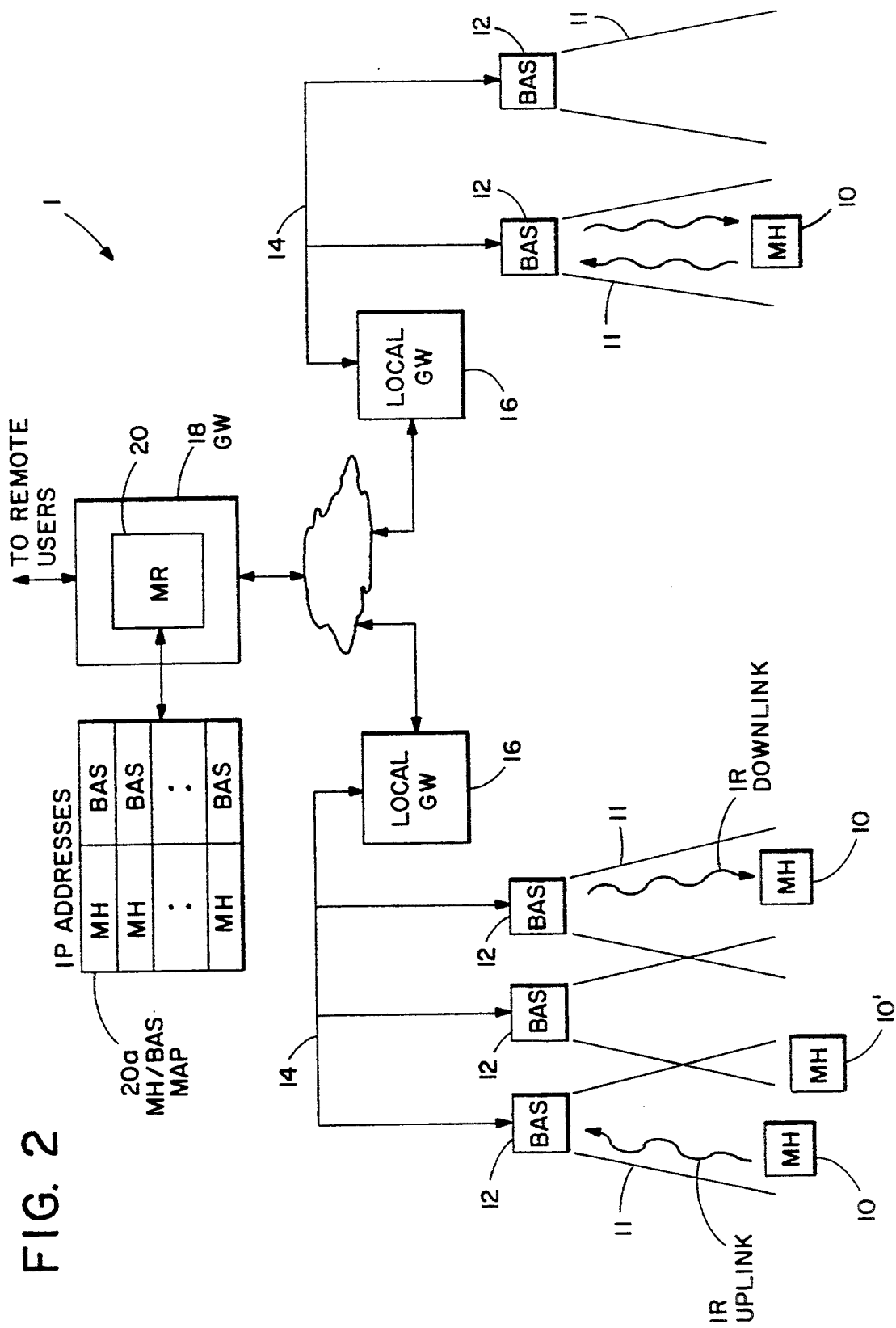
FIG. 2 is a block diagram showing a plurality of mobile hosts in bidirectional wireless communication with two LANS via a plurality of base access stations.

Reference is made to FIG. 2 where there is illustrated a communications area network 1. The network 1 includes one or more local area networks (LANs) 14. Each LAN 14 includes a wireless network comprised of at least one Mobile Host (MH) 10 in wireless communication with one or more Base Access Stations (BAS) 12. Each of the BASs 12 is bidirectionally coupled to one of the wired LANs 14, also referred to herein as Level 2 subnetworks. In the presently preferred embodiment of the invention the wireless medium is comprised of infrared (IR) radiation, although other embodiments may employ an RF wireless medium. Each of the BASs 12 has associated therewith a communications coverage area, or cell 11, which may or may not overlap one another. Communication between MHs 10, and from a MH 10 to other entities coupled to the network, is through the BASs 12, via the LAN 14. Communication between the BASs 12 is primarily via the LAN 14.

One suitable embodiment for the BASs 12 and the MHs 10 is disclosed in commonly assigned U.S. Pat. No. 5,068,916, issued Nov. 26, 1991, entitled "Coordination of Wireless Medium Among A Plurality Of Base Stations", by C. G. Harrison and Peter D. Hortensius. It should be realized, however, that the teaching of the invention may be embodied within a number of different types of wireless network embodiments.

If there is more than one Level 2 subnetwork (LAN), then each of the LANs 14 preferably includes at least one local gateway (GW) 16 for coupling the MH 10, via the BAS 12 and the LAN 14, to a gateway 18. The connection between the local gateways 16 and the gateway 18 may be via some arbitrary number of additional gateways. The gateway 18 is also coupled to remote network users who may be dispersed over a wide geographic area. The local gateways 16 may each be an "intelligent" BAS, or may be a separate dedicated network entity as shown. The gateway 18 is preferably a data processor having suitable network adapters and an archival facility.

An IP address consists of four bytes, or 32 bits, that are partitioned into a LAN identification and a Host identification. By example, an IP address may have the form 123.45.67.12. In the absence of a subnet mask, the first one, two, or three bytes encode a LAN address. For example, the LAN address may be encoded as 123 (byte 1) and 45 (byte 2). The remaining bits generally encode Host address information. In the example provided Host (12) may have up to 64K IP addresses associated therewith, as encoded in the third and fourth bytes.

It is assumed in the ensuing description that each MH 10 has a Network Layer Address (IP address or an NSAP). This address is referred to as a "permanent address" that does not change as the MH 10 migrates between Level 2 subnetworks. However, it is within the scope of the invention to provide dynamic creation of such a "permanent" address for the MH 10, as is described in the aforementioned commonly assigned U.S. patent application entitled "Network Address Management for a Wired Network Supporting Wireless Communication to a Plurality of Mobile Users", Ser. No. 07/605,592, filed Oct. 29, 1990, by C. E. Perkins. As such, the gateway 18 may include components for maintaining and allocating pseudo-IP addresses to the MHs 10, as described in the above referenced commonly assigned U.S. patent application Ser. No. 07/605,592.

It is also assumed that each MH 10 has at least one server, referred to herein as a Mobile Router (MR) 20. The functionality of the MR 20 is included within the gateway 18, and is shown as such in FIG. 2. The MR 20 serves two functions.

Firstly, the MR 20 is used as a "proxy" for "permanent addresses" assigned to MHs 10. In other words, the MR 20 advertises reachability (via routing protocols) to the addresses of the MHs 10 for which it acts as a proxy. It should be noted that such an advertisement has no implications on the actual Level 2 subnetworks that the MR 20 is attached to.

Secondly, as a MH 10 moves between different Level 2 subnetworks, the MR 20 that is currently acting as a proxy for that MH 10 is informed of the MHs 10 location, via the BAS 12, as described in detail below.

For redundancy, a MH 10 may have more than one MR 20 associated therewith. Thus, there is no restriction implied or intended as to the number of MRs 20 associated with a single MH 10, although the MH 10 will own but a single IP address.

It is also assumed herein that a given MH 10 can ascertain a Network Layer address of the MR 20 that serves as its proxy by way of, by example only, a MH system management function, or by a static configuration.

From a network layer routing point of view, a given MH 10 is always considered to be attached to the one of the Level 2 subnetworks as defined by the permanent IP address or pseudo-IP address of the MH 10. An MR 20 associated with a given MH 10 functions as the closest network layer gateway to the MH 10.

Each MH 10 maintains its network connectivity by accepting service from the BAS 12 that transmits data to and receives data from the mobile host during the time that the MH 10 is within a coverage area served by the BAS 12. For example, if the wireless communication occurs in the infrared (IR) frequency spectrum, a BAS 12 would be limited to servicing mobile hosts within infrared range of the BAS 12. As was noted above, the area served by a BAS 12 is referred to as a "cell" and cells served by different BASs 12 may overlap. As seen in FIG. 2, a given MH 10' may be positioned within an overlap between two or more cells 11 and, as a result, in some embodiments of the invention may be serviced by each of the associated BASs 12. However, service by more than one BAS 12 is not required and, thus, the teaching of the invention may also be practiced in a wireless network wherein only one BAS 12 may be assigned responsibility, at any given time, for a MH 10.

It is also assumed that a given MH 10 can ascertain the network layer address of a BAS 12 (or one of the interfaces of the BAS 12) serving the current cell wherein the MH 10 is located, and that a BAS 12 can ascertain network layer addresses of all operational MHs 10 within the cell served by the BAS 12. Both of these assumptions are based on the bidirectional communications capability that exists between a BAS 12 and the MH(s) 10 with the associated cell 11.

As the MH 10 moves or migrates, the set of the BAS(s) 12 that the MH 10 can reach within a Level 2 subnetwork (within a single network layer hop) may change. As employed herein, a network layer hop is considered to be a transmission between two network entities without involving intermediate network entities. The method of the invention requires that a MH 10 notify the associated MR(s) 20 of such changes by supplying the MR(s) 20 with the address(es) of the BAS(s) 12 that are currently reachable by the MH 10. The MR 20 maintains this information within a MH/BAS MAP 20a, wherein the IP address of each MH 10 is associated with one or more IP addresses of the BASs 12.

An aspect of this invention is the use of an IP feature known as a Loose Source Record Routing, or Loose Source Routing (LSR) option. By exploiting the LSR option in a novel fashion within the context of a wireless network having migrating MHs 10, the invention enables a packet from a source host to bypass the MR 20 and to be routed instead directly to the BAS 12 that serves the MH 10 that is the destination for the packet.

Figure 1:
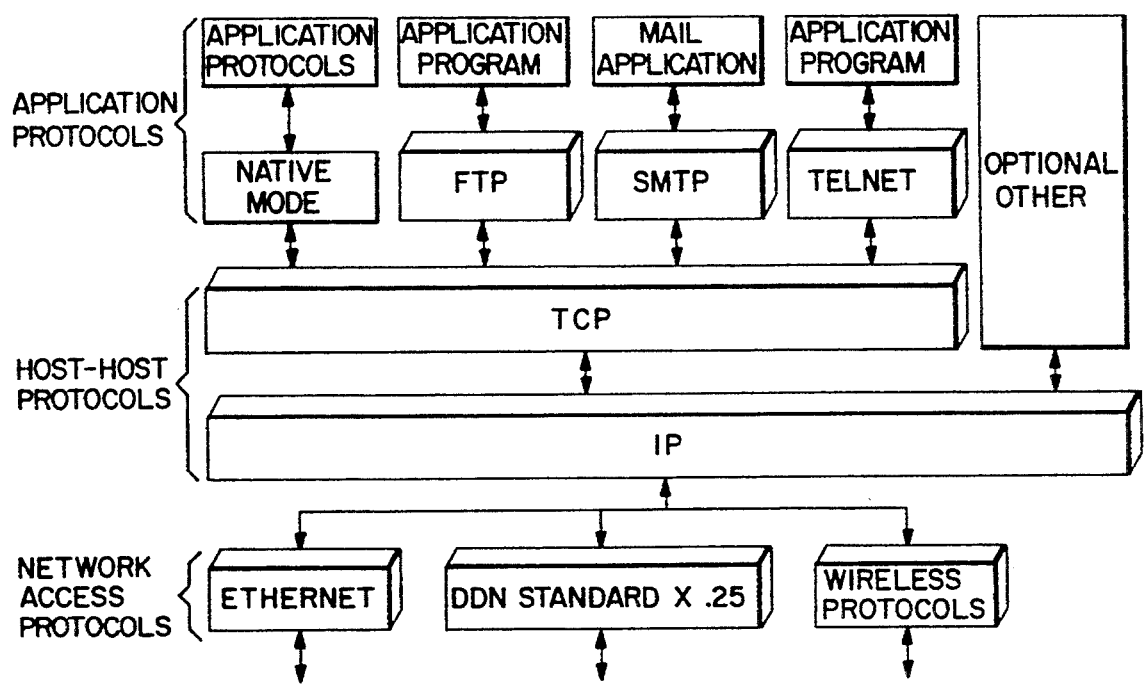
FIG. 1 is a prior art architectural diagram of the Defense Data Network.
Figure 3A:
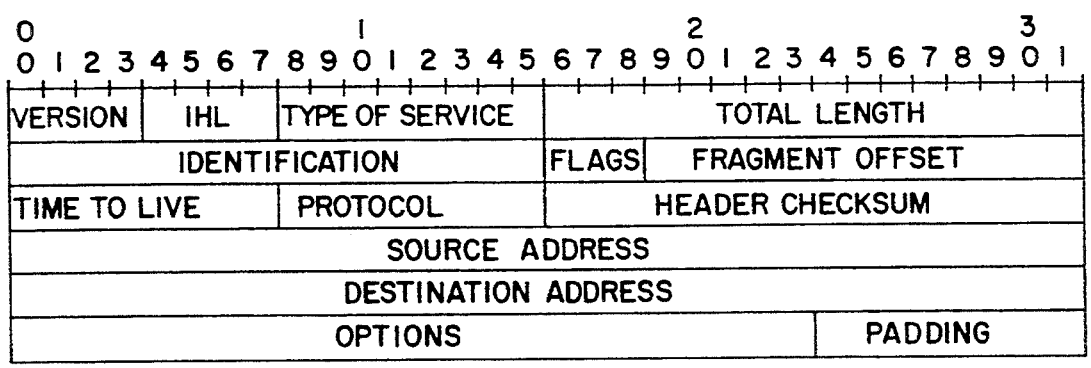
FIG. 3a illustrates a format of an Internet Datagram Header.

As seen in FIG. 3a, the contents of an internet datagram header includes an OPTIONS field. Options may or may not appear in a datagram. What is optional is their transmission in any particular datagram, not their implementation. That is, the OPTIONS must be implemented by all IP modules (hosts and gateways). The option type of particular relevance herein is the LSR option, which is used to route an internet datagram based on information supplied by the source of the datagram.

Figure 3B:
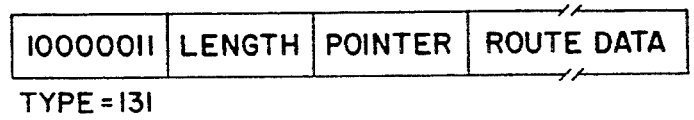

Referring to FIG. 3b, the LSR option provides a means for the source of an internet datagram to supply routing information to be used by the gateways in forwarding the datagram to the destination, and to record the route information.

The LSR option begins with the option type code (131). The second octet is the option length, the length including the option type code, the length octet, a Pointer octet, and length-3 octets of Routing Data. The third octet is the Pointer into the Route Data, and which indicates the octet which begins the next source address to be processed. The Pointer is relative to this option, and the smallest legal value for the Pointer is four.

The Route Data is composed, typically, of a series of internet addresses. Each internet address is 32 bits, or four octets. If the Pointer is greater than the length, that is the Pointer points beyond the last address entry in the Route Data, the source route is empty (and the recorded route full) and the routing is then based on the datagram Destination Address Field (FIG. 3a).

If the address in the Destination Address Field has been reached, and the Pointer is not greater than the length, the next address in the source route replaces the address in the Destination Address Field, the recorded route address replaces the Source Address just used, and the Pointer is increased by four.

The recorded route address is the internet module's own internet address, as known in the environment into which this datagram is being forwarded.

The procedure of replacing the source route with the recorded route (though it is in the reverse of the order required to be used as a source route) means that the LSR option (and the IP header as a whole) remains a constant length as the datagram progresses through the internet.

This option is referred to as a Loose Source Route because the gateway 18 (MR 20) or host IP is allowed to use any route of any number of intermediate gateways to reach the next address in the route.

As employed by the invention, the LSR option includes a list of network layer addresses of the BAS(s) 12 serving the current location of the MH 10, and employs the Pointer to point to one of the addresses. It is a specified requirement of the Network Layer Protocol that responses to packets that use the LSR option be delivered along the reverse of the path specified by the packet initiating the response (e.g. the packet from the MH 10). Thus, it follows that forwarding of the response packets is determined by the addresses specified by the LSR option, i.e. the addresses of the BAS(s) 12 of the cell(s) presently serving the MH 10. As a result of the use of the LSR option, a single IP header conveys information both about the identity of the MH 10, in the form of the Destination Address of the packet, as well as about the topological location of the MH 10, in the form of the BAS 12 address entry or entries of the LSR option Route Data fields.

When one source host sends a Network Layer Protocol Data Unit (NPDU) to another host (destination), and if the destination is the MH 10, then there exists only one of two possible conditions:

a) the source host is initiating a data stream to the destination, with no previous knowledge of the destination host's whereabouts; or b) the source host is sending data to the destination in response to some previous transmission by that destination host.

Figure 4:
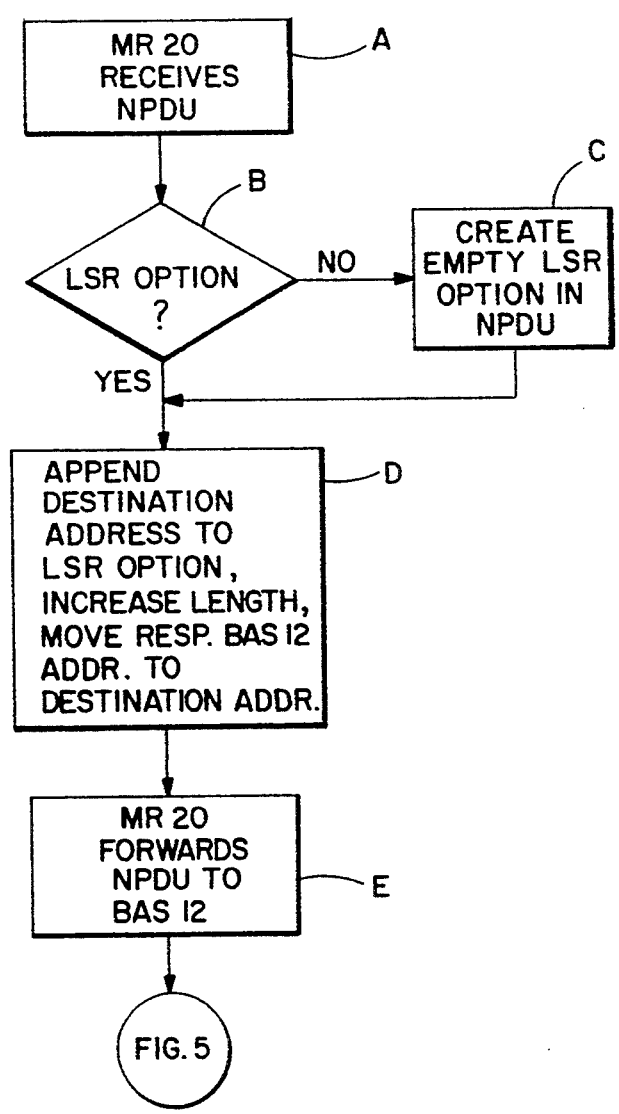
FIGS. 4 and 5 are each a flowchart that illustrate an aspect of the method of the invention.

In the case (a), and as seen in the flow chart of FIG. 4, the NPDU is delivered in accordance with conventional IP routing from the source host to the MR 20 which has previously advertised reachability to the destination address (Block A). Upon receipt of the NPDU, the MR 20 makes a determination if the NPDU has a LSR option (Block B). If NO, and in that the MR 20 maintains a record of the network layer address(es) of the BAS(s) 12 that serve the cell(s) that the destination MH 10 is presently located (BAS/MH MAP 20a), the MR 20 creates an empty LSR option in the NPDU (Block C). That is, an LSR option is created wherein the Route Data is empty, and wherein the Pointer points to the first (null) Route Data address.

Control then passes to Block D, as it also does if the determination at Block B is YES. That is, if YES at Block B, the incoming NPDU already contains a Loose Source Route option.

The MR 20 operates at Block D to first append the content of the IP header Destination Address field to the end of the LSR option Route Data. At this point, the Destination Address is the address of the MH 10 to which the NPDU is directed. The MR 20 then increases the LSR option Length accordingly. Next, the MR 20 accesses the MH/BAS Map 20a to retrieve the address of a BAS 12 that is responsible for the MH 10 to which the NPDU is directed. The address of the responsible BAS 12 is then inserted into the Destination Address of the NPDU.

At Block E the MR 20 forwards the NPDU, in accordance with the address in the Destination Address field, to the BAS 12 that is currently responsible for the MH 10 to which the NPDU is directed.

It is noted that for condition (a) the LSR option will typically not be on. However, if the datagram is first sourced by another MH 10, and assuming that, in accordance with the invention, all MH 10 sourced datagrams are always sent with the LSR option turned on, then the YES condition at Block B will be satisfied.

In the case (b) the source host will have previously received a packet from the destination MH 10 specifying the return path to the destination MH 10, using the Loose Source Routing option of the Network Layer Protocol. The network will (as required) attempt to deliver the packet to the destination, which was taken from the next address in the list of addresses specified with the LSR option. The destination address will, in accordance with the invention, correspond to a BAS 12 that is presently serving the destination MH 10.

As a MH 10 moves from one Level 2 subnetwork to another, its current cell and, thus, BAS 12, also changes. If the traffic between a pair of hosts is bidirectional, then the recipient of an NPDU directly notifies the originator of the NPDU of its movement by inserting the address of the new BAS 12 as the Destination Address. This occurs when the recipient host sends NPDUs back to the originating host. According to the "Host Requirements", specified by "Requirements for Internet Hosts Communications Layers", by R. Braden, RFC 1122 (10/89), when a host receives a Network Layer NPDU destined to it with the LSR option in the NPDU, the host is required to reverse the Source Route and use it to form the return source route for reply datagrams. This operation is specified in detail in Section 3.2.1.8 of the above referenced RFC 1122.

That is, and in accordance with this path reversal technique that is employed by the teaching of the invention, if a host receives a datagram containing a completed source route, i.e. the pointer points beyond the last address field, the datagram is considered to have reached its final destination. The source route option (recorded route), as received, is passed up to the Transport layer, or to ICMP message processing. The recorded route is reversed and is used to form a return source route for reply datagrams. When the return source route is built, it is correctly formed even if the recorded route included the source host.

Furthermore, and as is specified in Section 3.2.1.8 of the RFC 1122, if a source-routed datagram is fragmented, each fragment will contain a copy of the source route. Since the processing of IP options (including a source route) must precede reassembly, the original datagram will not be reassembled until the final destination is reached.

For example, a source routed datagram is to be routed from a source (S) host to a destination (D) host via gateways G1, G2, . . . Gn. An ambiguity may exist in the specification as to whether the source route option in a datagram sent out by S should be (A) or (B):
(A): {>>G2, G3, . . . Gn, D} (correct), or
(B): {S, >>G2, G3, . . . Gn, D} (incorrect),
where >> represents the Pointer. If (A) is sent, the datagram received at D will contain the option:
{G1, G2, . . . Gn >>},
with S and D as the IP source and destination addresses, respectively. If (B) were sent, the datagram received at D would again contain S and D as the IP source and destination addresses, but the option would be:
(S, G1, . . . Gn>>), i.e., the originating host would be the first hop in the route.

In accordance with the teaching of the invention, when a MH 10 moves from one Level 2 subnetwork to another, while communicating with another host, only the first NPDU sent to the MH 10 would go through the MR 20 that acts as the proxy for the MH 10. The remainder of the NPDUs then flow instead to the MH 10 directly through the BAS 12 currently servicing the MH 10, as indicated by the LSR Option.

In accordance with the invention the use of the LSR Option, in effect, produces a "shortcut routing"between a pair of hosts. The shortcut routing significantly improves the optimality of routing between hosts, when at least one of the hosts is mobile and does not have a fixed point of connection to the network.

As the MH 10 moves, the cell and BASs 12 to which it is connected through, by example, the bidirectional IR wireless link, also changes. In the process of moving from one cell to another it is possible for a MH 10 to be located in more than one cell, such as the MH 10' of FIG. 2, and to thus be able to receive service from more than one BAS 12. To facilitate shortcut routing the MH 10 may, but is not required to, insert the addresses of all the relevant BASs into the Loose Source Route option. The order in which these addresses are specified in the Loose Source Route option may be irrelevant, or may be based on criteria such as signal strength, with the BAS 12 having the highest signal strength being listed first.

As a result, it is typically unnecessary to involve the MR(s) 20 that act as proxies for the MH 10 as the MH 10 moves. This technique yields even a greater optimality in routing. It should be noted, however, that the MH 10 must inform the MR 20 of any changes in the identities of the BASs that are serving the MH 10, in that such changes amount to changes to the topology of the Level 2 subnetwork containing the "permanent" address of the MH 10.

By supplying the associated BAS 12 address in each reply NPDU, a MH 10 informs the originator of the packet traffic about its most current network location. By using the address of the BAS 12 recipient (supplied in the reply NPDUs), the originator of the traffic is enabled, in effect, to track the most current location of the recipient of the traffic. Such tracking enables the construction of optimal routes between a pair of hosts, using the facilities of the IP, while at the same time minimizing the involvement of the MR(s) 20.

Figure 5:
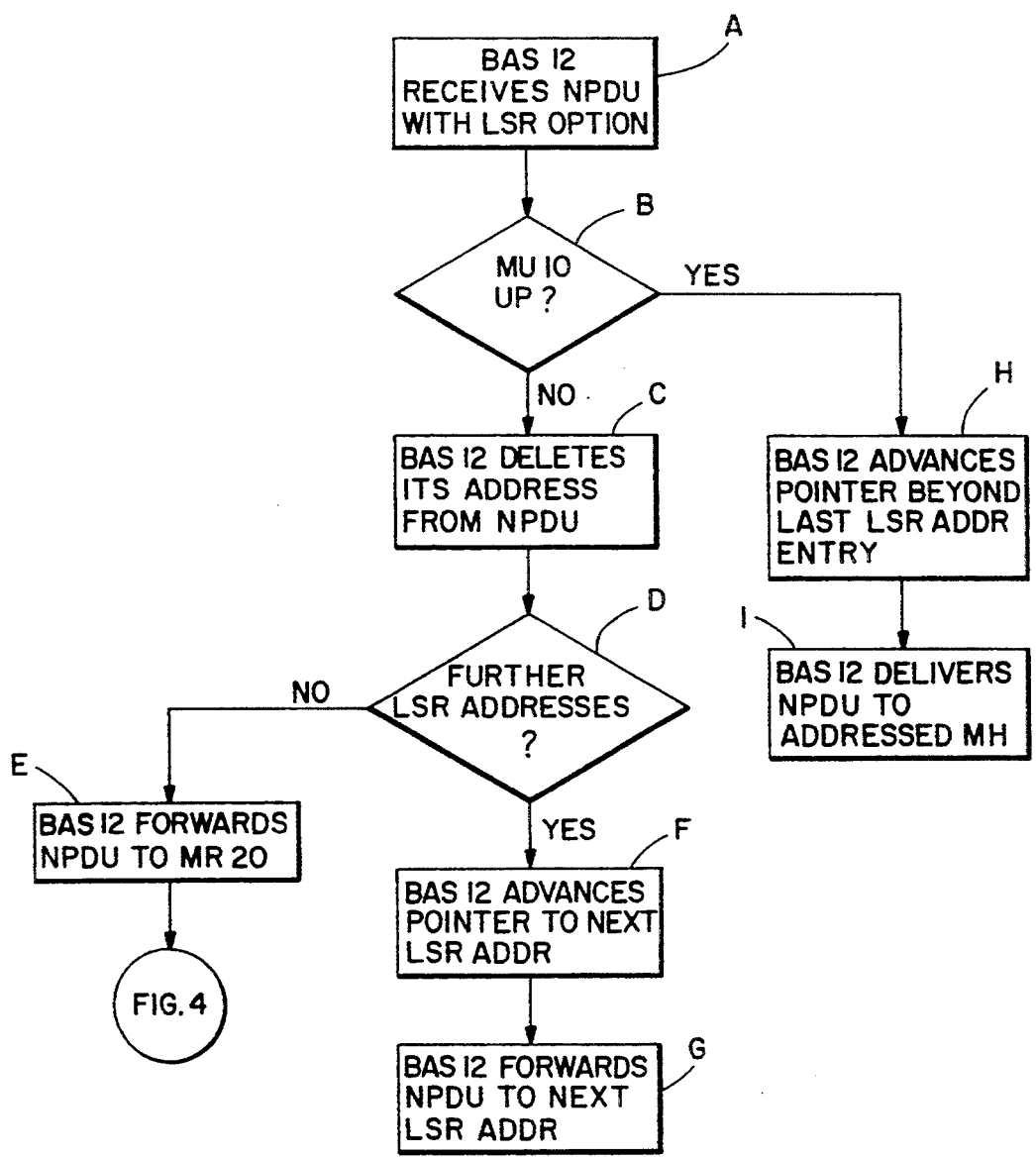

As seen in the flowchart of FIG. 5, when a BAS 12 receives an NPDU with the LSR option (Block A), the BAS 12 first examines the last LSR option address data entry, i.e. the address of the mobile host 10. The BAS 12 then determines at Block B whether the addressed MH 10 is "up" (i.e. currently located within the cell served by the BAS 12). If the MH 10 is not up, the BAS 12 deletes its own IP address from the Destination Address field (Block C). The BAS 12 then determines at Block D if there are any intermediate LSR option addresses before the last LSR option address of the MH 10. If NO, the BAS 12 forwards the NPDU to the MR 20, and processing continues in accordance with the flowchart of FIG. 4. If YES at Block D, the BAS 12 advances the Pointer in the LSR option to the next address entry (Block F) and proceeds to forward the NPDU to the next entry in the LSR option (Block G).

If the MH 10 is up (YES at Block B), the BAS 12 processes the LSR option by inserting its Destination Address into the LSR option Route Data at the current Pointer location. The BAS 12 also takes the last Route Data address, that is the address of the MH 10, and puts the MH 10 address into the Destination Address. The BAS 12 advances the Pointer beyond the end of the LSR option (Block H), and delivers the NPDU directly to the MH 10 that is specified in the datagram header Destination Address (Block I). If the BAS 12 advances the pointer beyond the last entry in the LSR, the forwarding of the NPDU is directly to that MH 10; otherwise the NPDU will be forwarded to the MR 20 associated with the destination MH 10. This occurs because the BAS 12 forwards the NPDU to the appropriate gateway, just as any agent would forward the packet to the MR 20, and all gateways have a record of the routing information advertised by the MR 20 for the address of the MH(s) served by the MR 20.

Receiving an NPDU with a MH 10 does not require any special processing, other than advancing the pointer beyond the end of the LSR option (if required) prior to any further processing so as to conform to the LSR option specification. In addition, for every incoming packet the MH 10 stores the portion of the LSR Option that does not have addresses of the BAS(s) 12 directly reachable by the MH 10. Such a LSR Option fragment may indicate, for example, the BAS(s) 12 that serve the originator of the packet if the originator is also a MH 10, or any host using the LSR option for any reason.

Sending an IP packet to another host involves constructing a LSR option as a concatenation of the BAS(s) 12 directly reachable by the MH 10, followed by the LSR extracted from the packet(s) received from that host (if any). The LSR pointer is set to point beyond the list of the BAS(s) 12 directly reachable by the MH 10, in that there is no need for the MH 10 to route the packet to the BAS(s) that serve the MH 10. This constructed LSR option is then inserted within the outgoing packet.

Some previous approaches for forwarding NPDUs between a pair of hosts attached to different Level 2 subnetworks involve datagram encapsulation by the MRs 20 and BASs 12. Moreover, at least one of these approaches ("IP-based Protocols for Mobile Internetworking", Ioannidis, J., Duchamp, D., Maguire, G., Proceedings SIGCOMM 1991) requires ubiquitous knowledge of the actual location of all the mobile hosts within a routing domain. That knowledge, in turn, may require significant information exchange between all the BASs 12 within the routing domain. For inter-domain connectivity the routing always involves a BAS 12 located in the "home" domain of a mobile host.

The present invention provides advantages over these previous approaches. Firstly, it does not require flooding the network with information, about actual locations of mobile hosts, to all the BASs 12 within a domain, as in the immediately above referenced proposal, in that for each MH 10 only the associated MR 20 has to maintain the location information, in the form of a MH 10, BAS 12 mapping.

Secondly, in many cases routes between MH 10s that involve inter-domain mobility are likely to be shorter than the routes obtained with above referenced proposal.

Thirdly, by restricting the knowledge of MH 10 movements to only the MH 10 itself, and the MR 20 of that MH 10, the teaching of the invention significantly simplifies security implications and authentication requirements.

Fourthly, by avoiding datagram encapsulation the invention avoids potentially detrimental performance implications associated with the fragmentation that may be necessary to accomplish encapsulation.

Fifthly, by avoiding datagram encapsulation the teaching of the invention reduces the amount of protocol information carried by NPDUs.

Finally, by avoiding datagram encapsulation the method of the invention reduces the overhead that otherwise would be imposed on BASs 12. That is, for most NPDUs the BASs 12 function as pure IP routers, without any knowledge of whether the NPDUs are destined to mobile or non-mobile hosts.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method for routing a packet of information between a first host and a second host that are coupled to a network, each of the hosts having a unique network address, wherein at least one of the hosts is a mobile host that does not have a fixed network coupling location, comprising the steps of:
    transmitting a packet from the mobile host to the second host on the network through a wireless link that is established between the mobile host and a first base access station that serves a current physical location of the mobile host, the first base access station being coupled to the network via a subnetwork, the packet including a first Loose Source Routing LSR option that includes a network address of the first base access station and possibly at least one further network address;
    receiving with the second host the packet that includes the first LSR option; and
    transmitting a further packet from the second host to the mobile host, via the first base access station and the wireless link, in accordance with a path reversal technique such that the further packet includes a second LSR option that includes the network address of the first base access station that was included within the first LSR option, whereby the further packet is directed through the network to the first base access station that serves the current physical location of the mobile host.

2. A method as set forth in claim 1 and further comprising the steps of:
    in response to the mobile host establishing a wireless link with a second base access station on the same or a different subnetwork,
    transmitting the network address of the second base access station from the mobile host to a mobile router that is coupled between the subnetwork and the network, the transmission including the network address of the mobile host; and
    maintaining, with the mobile router, the network address of the mobile host and the network address of the second base access station.

3. A method as set forth in claim 2 and including a step of transmitting to the network from the mobile router the network address of the mobile router and the network address of the mobile host.

4. A method as set forth in claim 2 wherein, in response to a reception of a packet by the mobile router from the network, the packet not including an LSR option and having the network address of the mobile host as a destination address, the method includes the steps of:
    converting the received packet into a packet that includes a newly created LSR option, the newly created LSR option being provided by the mobile router with the network address of the mobile host, the received packet further being provided with a destination address of a base access station that is serving the physical location within which the mobile host is currently located;
    forwarding the converted packet from the mobile router to the base access station that serves the physical location within which the mobile host is currently located; and
    receiving the converted packet and forwarding the received converted packet from the base access station over the wireless link to the mobile host.

5. A method as set forth in claim 1 wherein the step of transmitting the further packet includes the steps of:
    receiving the further packet with the first base access station; and
    determining if the mobile host is currently located within the physical area served by the first base access station;
    if it is determined that the mobile host is currently located within the physical area served by the first base access station, forwarding the further packet from the first base access station over the wireless link to the mobile host; else
    if it is determined that the mobile host is not currently located within the physical area served by the first base access station, and if it is determined that the second LSR option does not include a network address other than the network address of the mobile host, forwarding the further packet from the first base access station over the subnetwork to a mobile router that is coupled between the subnetwork and the network; and
    forwarding the further packet from the mobile router to a second base access station that serves a physical location within which the mobile host is currently located.

6. A method as set forth in claim 5 wherein, if it is determined that the mobile host is not currently located within the physical area served by the first base access station, the step of forwarding the further packet from the first base access station over the subnetwork to the mobile router includes an initial step of deleting the address of the first base access station from the further packet.

7. A method as set forth in claim 5 wherein, if it is determined that the mobile host is currently located within the physical area served by the first base access station, the step of forwarding the further packet from the first base access station over the wireless link to the mobile host includes an initial step of advancing an LSR option address pointer beyond a last LSR option address.

8. A method as set forth in claim 5 wherein, if it is determined that the mobile host is not currently located within the physical area served by the first base access station, the method includes a step of:
 deleting the network address of the first base access station from the further packet; and, if it determined that the LSR option includes a further network address other than the network address of the mobile host, the method further includes the steps of:
 advancing a LSR option address pointer to the next, further network address; and
 forwarding the packet to the next network address.

9. A method as set forth in claim 1 wherein the wireless link is an infrared radiation link.

10. A method for routing a packet of information between two hosts that are coupled to a network, each of the hosts having a unique network address, wherein at least one of the hosts is a mobile host that does not have a fixed network coupling location, comprising the steps of:
 in response to a reception of a packet from the network by a mobile router, the packet not including an LSR option and having the network address of the mobile host as a destination address,
 converting the received packet into a packet that includes a LSR option, the LSR option being provided by the mobile router with the network address of the mobile host, the received packet further being provided with a destination address of a base access station that is serving, with a wireless communication link, a physical location within which the mobile host is currently located;
 forwarding the converted packet from the mobile router to the base access station that serves the physical location within which the mobile host is currently located; and
 receiving the converted packet and forwarding the received converted packet from the base access station over the wireless link to the mobile host.

11. A method as set forth in claim 10 wherein the step of receiving the converted packet includes the steps of:
 determining if the mobile host is currently located within the physical area served by the base access station;
 if it is determined that the mobile host is currently located within the physical area served by the base access station, forwarding the converted packet from the base access station over the wireless link to the mobile host; else
 if it is determined that the mobile host is not currently located within the physical area served by the base access station, and if it is determined that the LSR option does not include a network address other than the network address of the mobile host, forwarding the converted packet from the base access station to the mobile router; and forwarding the converted packet from the mobile router to another base access station that serves a physical location within which the mobile host is currently located.

12. A method as set forth in claim 10 wherein the wireless link is an infrared radiation link.

13. A method as set forth in claim 10 wherein the network address and the destination address are Internet addresses.

14. A method as set forth in claim 10 wherein the steps of receiving and forwarding are accomplished using an Internet Protocol.

15. A mobile host having a network address, the mobile host comprising:
 means for bidirectionally communicating with a data communications network through a first base access station over a wireless communications link, the first base access station serving a wireless communications cell that encompasses a current physical location of the mobile host; and
 means for transmitting an information packet to the data communications network, the information packet being transmitted over the wireless communications link to the first base access station, the information packet including a first Loose Source Routing LSR option that includes a network address of the first base access station.

16. A mobile host as set forth in claim 15 and further comprising means for receiving an information packet from the data communications network, the information packet being received from the first base access station over the wireless communications link, the received information packet including a second LSR option that includes the network address of the first base access station.

17. A mobile host as set forth in claim 15 and further comprising means, responsive to the mobile host establishing a wireless communications link with a second base access station, for transmitting the network address of the second base access station from the mobile host to a mobile router that is coupled to the network, the transmission including the network address of the mobile host.

18. A mobile host as set forth in claim 15 wherein said means for bidirectionally communicating includes means for transmitting and receiving infrared radiation signals.

19. A data communications system for routing a packet of information over a network, comprising:
 at least one mobile host having a network address, said at least one mobile host not having a fixed network coupling location, said at least one mobile host including means for bidirectionally communicating with a wireless communications link;
 at least one base access station that is coupled to the network and that serves a communication cell by means of the wireless communication link; and
 a mobile router having means for transmitting information packets to the network and means for receiving information packets from the network, said mobile router further including means, responsive to a reception of an information packet from the network, the packet not including a Loose Source Routing LSR option and having a network address of a mobile host as a destination address, for converting the received information packet into a converted packet that includes a LSR option, said converting means providing the LSR option with the network address of the mobile host and also providing the converted packet with a destination address of a selected base access station that is serving, through the wireless communication link, a communication cell within which the mobile host was last known to be located.

20. A data communications system as set forth in claim 19 wherein said mobile router further includes means for forwarding the converted packet to said selected base access station having the destination address, and wherein said selected base access station includes means for receiving the converted packet and means for transmitting the received packet over the wireless communication link to the mobile host.

* * * * *